United States Patent
Bender et al.

(10) Patent No.: US 11,232,385 B2
(45) Date of Patent: Jan. 25, 2022

(54) SYSTEM AND METHOD TO MEASURE OPTIMAL PRODUCTIVITY OF A PERSON ENGAGED IN A TASK

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); Edward T. Childress, Austin, TX (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 15/358,355

(22) Filed: Nov. 22, 2016

(65) Prior Publication Data
US 2018/0144281 A1    May 24, 2018

(51) Int. Cl.
*G06Q 10/06* (2012.01)
*G06K 9/00* (2006.01)
*H04L 29/08* (2006.01)

(52) U.S. Cl.
CPC ....... *G06Q 10/06398* (2013.01); *G06Q 10/06* (2013.01); *G06Q 10/0631* (2013.01); *G06Q 10/0639* (2013.01); *G06K 9/00335* (2013.01); *H04L 67/12* (2013.01)

(58) Field of Classification Search
CPC combination set(s) only.
See application file for complete search history.

(56) References Cited

U.S. PATENT DOCUMENTS

| 6,675,130 B2* | 1/2004 | Kanevsky | G06Q 10/06 |
| | | | 702/188 |
| 7,234,943 B1 | 6/2007 | Aleali | |
| 8,195,475 B1* | 6/2012 | Landsman | G16H 50/30 |
| | | | 705/2 |
| 8,862,945 B2 | 10/2014 | Verbest | |
| 9,497,832 B2* | 11/2016 | Verberkt | H05B 37/0227 |

(Continued)

FOREIGN PATENT DOCUMENTS

JP    H11276461    10/1999

OTHER PUBLICATIONS

J. Schwarz, S. Fuchs and F. Flemisch, "Towards a more holistic view on user state assessment in adaptive human-computer interaction," 2014 IEEE International Conference on Systems, Man, and Cybernetics (SMC), 2014, pp. 1228-1234, doi: 10.1109/SMC.2014.6974082. (Year: 2014).*

(Continued)

*Primary Examiner* — Crystol Stewart
(74) *Attorney, Agent, or Firm* — Schmeiser, Olsen & Watts, LLP; Anthony V. England (57) ABSTRACT

A method and system analyzes the productivity of a person engaged in a task. A computing device receives configuration data from sensors including environmental parameters related to a corresponding productivity score of the person engaged in the task. The environmental parameter data is analyzed to determine any impact on the person's productivity during the task. Changes in the productivity score and corresponding environmental parameters are stored in the computing device, and optimum values are determined.

6 Claims, 2 Drawing Sheets

(56) References Cited

U.S. PATENT DOCUMENTS

| | | | |
|---|---|---|---|
| 10,408,482 B2* | 9/2019 | Ro | F24F 11/30 |
| 2003/0163427 A1* | 8/2003 | Fung | G06Q 30/02 |
| | | | 705/51 |
| 2006/0020509 A1 | 1/2006 | Strain | |
| 2009/0006574 A1 | 1/2009 | Horvitz et al. | |
| 2009/0070163 A1* | 3/2009 | Angell | G06Q 10/04 |
| | | | 705/7.26 |
| 2009/0106062 A1* | 4/2009 | O'Neill | G06Q 10/06375 |
| | | | 705/7.37 |
| 2009/0222552 A1 | 9/2009 | Chroscielewski | |
| 2009/0228318 A1* | 9/2009 | Ara | G06Q 10/06 |
| | | | 705/7.42 |
| 2009/0271609 A1* | 10/2009 | Baskey | H04M 1/72448 |
| | | | 713/100 |
| 2010/0235206 A1* | 9/2010 | Miller | G06Q 10/063 |
| | | | 705/7.11 |
| 2011/0252356 A1 | 10/2011 | Morris | |
| 2011/0264710 A1* | 10/2011 | Arunagiri | G06Q 10/0639 |
| | | | 707/805 |
| 2012/0198372 A1 | 8/2012 | Kuhlke | |
| 2013/0080215 A1* | 3/2013 | Kawai | G06Q 10/06395 |
| | | | 705/7.41 |
| 2013/0184997 A1 | 7/2013 | Mott | |
| 2013/0268128 A1* | 10/2013 | Casilli | H04L 67/36 |
| | | | 700/276 |
| 2014/0121559 A1 | 5/2014 | Stevens | |
| 2014/0163333 A1 | 6/2014 | Horseman | |
| 2014/0214498 A1* | 7/2014 | Dasgupta | G06Q 10/06398 |
| | | | 705/7.42 |
| 2014/0222522 A1* | 8/2014 | Chait | G06Q 10/0637 |
| | | | 705/7.36 |
| 2015/0046233 A1* | 2/2015 | Srulowitz | G06Q 10/06398 |
| | | | 705/7.42 |
| 2015/0140528 A1 | 5/2015 | Sikström et al. | |
| 2015/0199915 A1 | 7/2015 | Myers et al. | |
| 2015/0269849 A1 | 9/2015 | McGill | |
| 2015/0359070 A1* | 12/2015 | Mead | G05B 19/042 |
| | | | 315/154 |
| 2015/0363734 A1* | 12/2015 | Leboucher | G06Q 10/06316 |
| | | | 705/7.26 |
| 2015/0371551 A1 | 12/2015 | Stearns | |
| 2016/0148141 A1* | 5/2016 | Kwak | G06Q 10/06315 |
| | | | 705/7.25 |
| 2016/0283887 A1* | 9/2016 | Jagyasi | G06Q 10/06398 |
| 2016/0358116 A1* | 12/2016 | Cline | G06Q 10/06398 |
| 2017/0169382 A1 | 6/2017 | Thapliyal | |
| 2017/0206479 A1* | 7/2017 | Iwasaki | G06Q 10/0639 |
| 2018/0203425 A1* | 7/2018 | Anderson | G06Q 10/0631 |
| 2019/0258944 A1 | 8/2019 | Matthew | |
| 2020/0364588 A1* | 11/2020 | Knox | H04L 67/12 |

OTHER PUBLICATIONS

Sabourin, Robert A.; List of IBM Patents or Patent Applications Treated as Related; Nov. 18, 2016; 1 page.

Gregory Ciotti, How Music Affects Your Productivity, Retrieved from Internet on Oct. 12, 2021: https://www.helpscout.com/blog/music-productivity/, 11 pages.

Raney et al., Using Eye Movements to Evaluate the Cognitive Processes Involved in Text Comprehension, J Vis Exp. 2014; (83): 50780, Published online Jan. 10, 2014. doi 10.3791/50780, Retrieved from Internet on Oct. 12, 2021: https://www.ncbi.nlm.nih.gov/pmc/articles/PMC4089416/, 11 pages.

Rayner, et al, Eye Movements as Reflections of Comprehension Processes in Reading, Article in Scientific Studies of Reading—Jul. 2006, DOI: 10.1207/s1532799xssr1003_3, https://www.researchgate.net/ublication/228625379_Eye_Movements_as_Reflections_of_Comprehension_Processes_in_Reading, 17 pages.

* cited by examiner

SYSTEM AND METHOD TO MEASURE OPTIMAL PRODUCTIVITY OF A PERSON ENGAGED IN A TASK

TECHNICAL FIELD

The invention relates to measuring and analyzing outside influences which affect the productivity of a person engaged in a task.

BACKGROUND

Prior art systems and methods to measure and adjust the productivity of a person engaged in a task fail to accurately measure and account for numerous environmental factors which vary for each individual. Accordingly, such systems and methods have a low probability of successfully assessing the productivity of a specific person engaged in a specific task.

SUMMARY

The present invention provides a method, and associated computer system and computer program product, for analyzing productivity of a person engaged in a task. The method implemented within a computing device includes the steps of: receiving and storing configuration data including identification of a task and baseline measurements of environmental parameters of the environment where the person is performing the task; storing environmental parameter data received from and captured by the environmental sensors to measure and monitor the environmental parameters impacting the person engaged in the task; and determining and storing upon completion of the task a current productivity value correlated to the environmental parameter data. The productivity value defines productivity of the person engaged in the task in response to the corresponding environmental parameter data received from and captured by the environmental sensors. Changes in the productivity score and corresponding environmental parameters are stored in the computing device, and optimum productivity and environmental parameter values are determined.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

The present invention relates to a method and system for measuring and analyzing outside influences which affect the productivity of a person engaged in a task, and in turn, communicating the effects of these outside influences so that adjustments can be made to provide an optimal work environment for heightened productivity of the person engaged in the specific task.

Many factors affect the productivity of a person engaged in a task. Different people are distracted by different outside influences depending in part on the task at hand and often an individual will not recognize that environmental factors are degrading his or her ability to perform and complete a task in a productive manner. It would therefore be beneficial if a system and method could be provided to aid a user, e.g. the person performing the task, in tracking environmental factors and suggesting changes with regards to one or more of the environmental factors to promote optimal productivity of the person engaged in the task.

Figure 1:
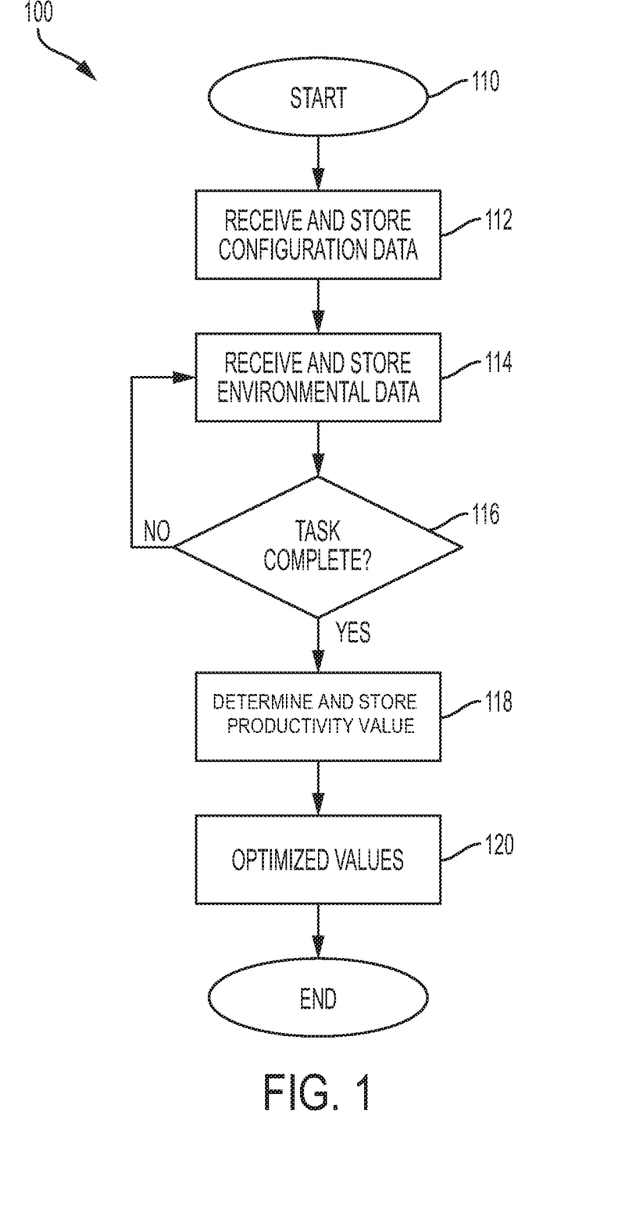
FIG. 1 is a flowchart diagram of a method of analyzing outside influences which affect the productivity of a person engaged in a task in accordance with embodiments of the present invention.

FIG. 1 is a flowchart diagram of a method 100 of analyzing outside influences which affect the productivity of a person engaged in a task in accordance with embodiments of the present invention.

Upon starting a task in step 110, configuration data aka profile data is immediately received and placed into a configuration file in step 112 by a computing device. The configuration data can include initial data whereby the person is embarking upon the task for the first time, or it can be configuration data that has been previously entered and stored whereby the task has been previously performed by the same individual. The configuration data can be received, for instance, from a database or from a user input device connected to the computing device. The computing device can be any kind of computing device with networking capability such as a computer, tablet or smart phone and the user input device can be, for example, a keyboard, touchscreen or mouse.

Configuration data in one example includes personal data of the person performing the task such as his name, age, height, weight, educational level, special skills related to the task at hand, training and experience. The configuration data would also include identification of the task at hand, including typical completion time and requirements for completing the task, as determined from previously accumulated and stored data, or from an estimation.

Typically when a task starts in step 110, the user would enter into the computing device the configuration data and time in step 112, and he or she would identify the task. The user, who can be the individual or person performing the task, would enter or select which environmental parameters to include as part of the configuration data. These parameters would be monitored during execution of the task. The user can also be a person other than the person performing the task, for instance, a system administrator.

A list of measurable environmental parameters includes, but is not limited to, ambient noise, sounds, lighting, temperature, visual activity which could distract the user, smells, vibrations, air movement, chair comfort of the user, etc. Any environmental parameter which could effect the productivity of the user engaged in the task can be considered.

In step 112, baseline values for the configuration data can be selected, automatically provided (e.g. from historical or statistical data), or directly measured in the environment where the person will complete the task. For instance in the current example the person engaged in the task has selected the environmental parameters to be the ambient temperature and the ambient noise/sound levels in his work area. He could select default values or perhaps more accurately have direct baseline measurements taken for the initial values. For direct measurements for example, an air temperature thermometer could measure the air temperature at the starting time of the task and the air temperature data would be received from a digital thermometer as an input value into her computer and recorded as the baseline measurement of the environmental temperature parameter.

Similarly, a noise level detector could measure the noise/sound level in the area of the person engaged in the task at the starting time of the task. The noise level reading could be received from the noise level detector as an input value into his computer and recorded as the baseline measurement of the noise level environmental parameter.

In the current example, the task is defined to extend throughout a two hour time period from 9-11 am in which assembly worker Jason is engaged in the task of assembling widgets by combining several pieces together on an assembly line, then putting each assembled widget into a Finished Product bin. Each time a widget is completed and dropped into the bin, a counter increments the number of finished widgets by 1 accounted to Jason.

Table I below shows environmental data for the widget assembly task which is measured at 10 minute intervals between 9:00-11:00 am on Monday while Jason is engaged in the current task.

TABLE I

| Time | Temp. | Sound |
|---|---|---|
| Initial profile values at 9:00 am | 68° F. | 40 dB |
| 9:10 | 68 | 44 |
| 9:20 | 68 | 45 |
| 9:30 | 68 | 39 |
| 9:40 | 71 | 39 |
| 9:50 | 72 | 40 |
| 10:00 am | 72 | 40 |
| 10:10 | 73 | 39 |
| 10:20 | 73 | 39 |
| 10:30 | 74 | 40 |
| 10:40 | 74 | 41 |
| 10:50 | 74 | 40 |
| 11:00 am | 74 | 40 |
| MONDAY | Average = 71° F. | Average = 40 dB |

The initial profile values, representing the initial configuration data that was input by Jason prior to or upon the start of the task, include environmental data of the ambient room start temperature of 68° F. at 9:00 am, and the ambient room start noise/sound level of 40 db at 9:00 am. Theses environmental values are measured every 10 minutes by an automated, computer system (e.g. computing device) having capabilities to measure sound levels and temperatures. The measurements are stored into the database of the computing device. As seen from the Table I, the average temperature from 9-11 am on Monday in the assembly area was determined to be 71° F. and the average ambient sound level in the assembly area was 40 dB.

The same assembly worker Jason was tested with varying environmental conditions of ambient temperature and sound each day from 9-11 am over a two week period, and the environmental parameter measurements were stored each day into the computer database along with a corresponding recordation of the number of widgets completed each day as shown in Table II.

TABLE II

| Date | Average Temperature | Average Sound Level | Widgets Completed | Productivity Value |
|---|---|---|---|---|
| Monday, Oct. 3, 2016 | 71° F. | 40 dB | 25 | 3 |
| Tuesday, Oct. 4, 2016 | 68 | 40 | 26 | 3 |
| Wednesday, Oct. 5, 2016 | 70 | 40 | 25 | 3 |
| Thursday, Oct. 6, 2016 | 72 | 40 | 26 | 3 |
| Friday, Oct. 10, 2016 | 74 | 40 | 24 | 2 |
| Monday, Oct. 11, 2016 | 65 | 48 | 21 | 2 |
| Tuesday, Oct. 12, 2016 | 68 | 49 | 20 | 2 |
| Wednesday, Oct. 13, 2016 | 70 | 48 | 21 | 2 |
| Thursday, Oct. 14, 2016 | 72 | 49 | 19 | 1 |
| Friday, Oct. 15, 2016 | 74 | 49 | 18 | 1 |

In step 114 of the current example, the computing device measures and stores the environment parameter data over a given period of time, such as for every 10 minute period as previously shown in Table I. During the measurement period if the task is not complete as determined in decision step 116, then the method returns to step 114 and further measurements are taken. In this example the task is completed each day after a 2 hour period, i.e. at 11:00 am.

Upon completion of the task at 11:00 am in decision step 316, the productivity value is determined in step 118 and stored in the memory of the computing device. For example in Table II the productivity value of 3 is determined when the task is completed on Monday Oct. 3, 2016.

In the current example, a productivity score/value is determined for Jason which reflects a relative estimate of productivity of Jason in performing the task. The productivity score in this example corresponds to the number of widgets that Jason completed each day between 9-11 am with respect to the measured environmental parameters, i.e. ambient temperature and sound. All of the measurements for the two week period of testing of Jason's productivity in assembling widgets is stored into the computer as historical data. Below is a listing of productivity scores:

Productivity=0 when less than 15 widgets are completed.
Productivity=1 when 15-19 widgets are completed.
Productivity=2 when 20-24 widgets are completed.
Productivity=3 when 25-30 widgets are completed.
Productivity=4 when more than 30 widgets are completed.

Of course, a different range or depiction of productivity values could be used, e.g. productivity scores from 1 to 100; excellent, good, bad; etc. Also, the productivity score/value can be any measurable parameter of Jason's productivity. In the current example the productivity score is a measure of the volume or number of finished widgets within the 2 hour time period of 9-11 am by Jason. In another example the productivity score could be a measure of time required to finish a given number of widgets. For instance, how long does it take Jason to finish assembly of one widget? In yet another example, the productivity score could be a measure of the quality of finished widgets. In this case there must be a measure of quality such as how many of the assembled, finished widgets operate properly, or how many of the assembled, finished widgets need further attention to correct defect issues. These quality productivity scores could be assigned by a person who inspects the finished widgets, or by any other manual or automated quality assurance process that is implemented into the process. For instance if the widget must adhere to a strict dimensional configuration (such as size and/or weight), then those quality control measurements would be made to each of the finished widgets to ensure compliance.

In some cases, the testing for productivity scores can be subject to trade-offs between factors such as the volume of widgets assembled in a given time period versus the number of completed widgets that pass quality control requirements (e.g. proper weight, size dimensions, color, operability, or any other requirements).

In the example above as recorded in Table II, it appeared that variations in the ambient sound levels had a significant impact on Jason's productivity, whereas temperature variations did not appear to have any significant effect on Jason's productivity. The 5 day daily averages for the first week included a 40 dB sound level, a temperature range of 68-74° F. with a 71° F. average, and an average productivity value of 2.8. During the second week the daily averages included a 48-49 decibel range with a 48.8 dB average, a 65-74° F. temperature range and 69.8° F. average, and an average productivity value of 1.6. When comparing the average productivity value of 2.8 for week 1 having average ambient noise of 40 dB with the average productivity value of 1.6 for week 2 having average ambient noise of 48.8 dB, clearly Jason is more productive in assembling widgets when the ambient noise/sound level is lower.

According to Table II, Jason's optimized productivity value and corresponding environmental parameters can be obtained from the historical data. In this example an optimized productivity value of 3 can be determined in step 120 under any of the conditions measured on October 3rd-6th. In other words in this example to optimize Jason's productivity the ambient noise should be (no more than) 40 dB and the ambient temperature should be in the range of 68-74° F. with a 71° F. average. Whenever Jason is undertaking this same task in the future, the optimal ambient temperature can be set to 71° F. from the computing device in accordance with instructions by a computer program running the productivity application.

The inventive method as described herein can be applied to a person engaged in any task. A few applications are listed, but not limited to: productivity of a cashier in a cafeteria; productivity of a person stocking goods; productivity of a marketing person making marketing phone calls; and productivity of a factory worker.

In the following example, a cashier Sophie is tested for productivity at a location where the measured environmental parameters will include background music selection being either jazz or top 40 hits. The ambient temperature is maintained at a constant 71° F. and the ambient sound level is maintained at a constant 40 dB. The task measures the productivity values corresponding to the number of completed widgets by Sophie between 1-3 pm each day.

TABLE III

| Date | Background Music | Widgets Completed | Productivity Value |
| --- | --- | --- | --- |
| Monday Oct. 17, 2016 | jazz | 25 | 3 |
| Tuesday Oct. 18, 2016 | jazz | 26 | 3 |
| Wednesday Oct. 19, 2016 | jazz | 26 | 3 |
| Thursday Oct. 20, 2016 | jazz | 26 | 3 |
| Friday Oct. 21, 2016 | jazz | 24 | 2 |
| Monday Oct. 24, 2016 | top 40 hits | 20 | 2 |
| Tuesday Oct. 25, 2016 | top 40 hits | 20 | 2 |
| Wednesday Oct. 26, 2016 | top 40 hits | 19 | 2 |
| Thursday Oct. 27, 2016 | top 40 hits | 18 | 1 |
| Friday Oct. 28, 2016 | top 40 hits | 16 | 1 |

Table III shown that when jazz background music was played, Sophie completed a total of 127 widgets during the 5 day testing period from October $17^{th}$ to $21^{st}$ This amounted to an average of 25.4 completed widgets and an average productivity value of 2.8 during each 2 hour block. In contrast, only 93 widgets were completed by Sophie from October $24^{th}$ to $28^{th}$ when top 40 background music was present, with an average productivity value of 1.6 corresponding to 18.6 completed widgets each day.

Notably this example shows that Sophie works well, with higher productivity, with the ambient temperature set at a constant 71° F. and the sound level set at a constant 40 dB while listening to background jazz music, compared to when listening to top 40 music. However, a different person engaged in the same task under the same environmental conditions may respond differently. In other words, some workers may prefer top 40 background music, different music, or no background music at all. In this sense the productivity value and related environmental parameters are uniquely tied to each individual person engaged in a specific task.

Once an optimal productivity score/value for a given task is determined for a particular individual with respect to specified environmental parameters, then the environmental parameters of the task environment can be set whenever that particular individual intends to engage in the given task. In this way, maximum productivity can be assured. As previously noted, the changes in environmental parameter values can be manually driven, or they can be automated from a computer, e.g. automatically setting a preferred ambient temperature when Jason is assembling widgets, or automatically setting the background music to jazz when Sophie is working as a cashier.

Figure 2:
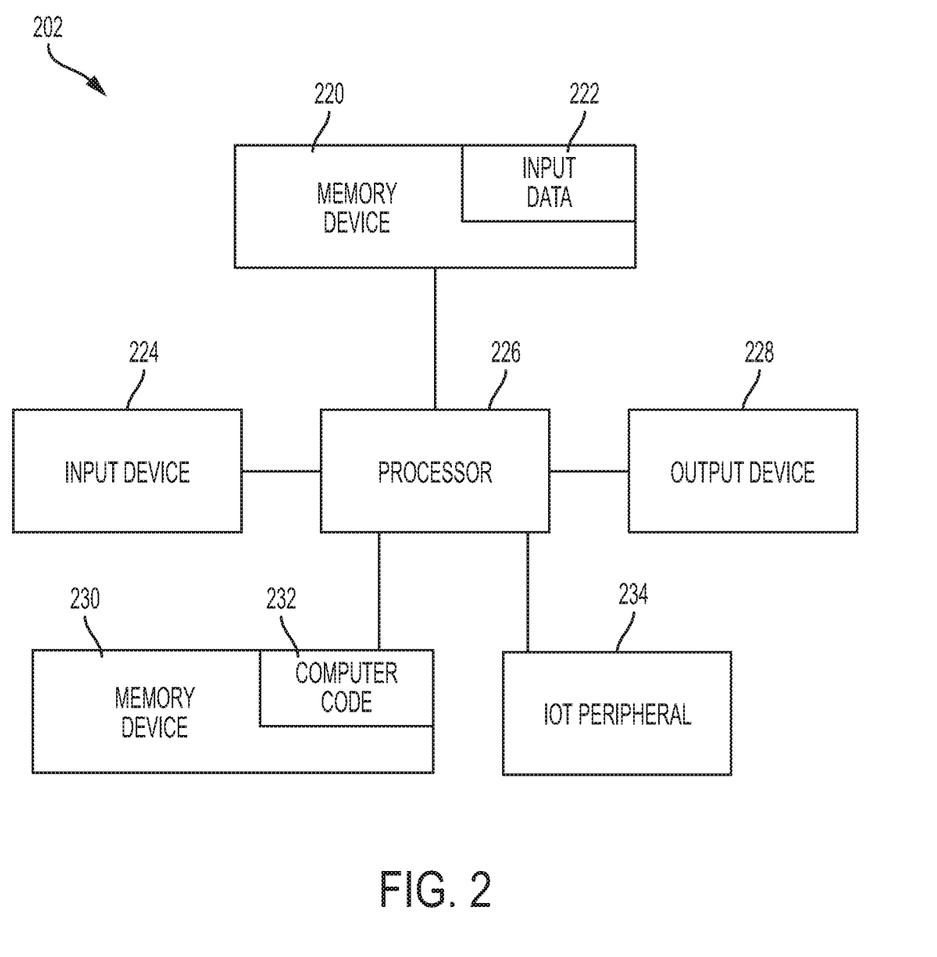
FIG. 2 is a block diagram of a computer system for analyzing outside influences which affect the productivity of a person engaged in a task in accordance with embodiments of the present invention.

FIG. 2 is a block diagram of a computer system, aka computing device, 202 for analyzing the focus or attention of a person engaged in a task in accordance with embodiments of the present invention. The computing device 202 includes a processor 226, an input device 224 coupled to the processor 226, an output device 228 coupled to the processor 226, memory devices 220 and 230 each coupled to the processor 226, and one or more Internet of Things (IoT) peripheral devices 234 connected, or built-in, to the computing device 202. The input device 224 may be, inter alia, a keyboard, a mouse, etc. The output device 228 may be, inter alia, a printer, a plotter, a computer screen, a magnetic tape, a removable hard disk, a floppy disk, etc. The memory devices 220 and 230 may be, inter alia, a hard disk, a floppy disk, a magnetic tape, an optical storage such as a compact disc (CD) or a digital video disc (DVD), a dynamic random access memory (DRAM), a read-only memory (ROM), etc.

The memory device 230 includes a computer code 232 which is a computer program that includes computer-executable instructions. The computer code 232 includes software or program instructions that may implement an algorithm for implementing methods of the present invention. The processor 226 executes the computer code 232. The memory device 220 includes input data 222. The input data 222 includes input required by the computer code 232. The output device 228 displays output from the computer code 232. Either or both memory devices 220 and 230 (or one or more additional memory devices not shown) may be used as a computer usable storage medium (or program storage device) having a computer readable program embodied therein and/or having other data stored therein, wherein the computer readable program includes the computer code 232. Generally, a computer program product (or, alternatively, an article of manufacture) of the computer system/device 202 may include the computer usable storage medium (or said program storage device). The processor 226 may represent one or more processors. The memory device 220 and/or the memory device 230 may represent one or more computer readable hardware storage devices and/or one or more memories.

The IoT peripheral 234 represents one or more devices for monitoring and measuring task focus parameters, and/or the environmental parameters. For instance in the example described hereinbefore, the IoT device was selected as a built-in video camera on the desktop work computer of the project manager engaged in the task. Many off-the-shelf software applications are well known and available to monitor and measure a user's eye movements and body movements using visual data received by the built-in camera on her desktop computer. In this case, the built-in computer camera is used as the focus sensor for sensing both the eye movements (i.e. eye focus parameter) and the body movements (i.e. body movement parameter) of the project manager.

The built-in camera device on most computing devices can be used to analyze any visually perceptible parameters of the user, such as eye movements, physical movements, facial expressions, head movements, body posture, blinking of eyes, and closing of eyes of the person engaged in the task. The camera could also be used as a visual sensor to detect a number of pages turned of reading material opened on the computing device, or to detect a number of other applications opened on the computing device.

Similar sensors and related applications for connecting the sensors to a computing device are available for computers and mobile devices such as smart phones and tablets. For instance, an eReader can be used to track changes in reading rate by monitoring how fast each page is being turned. Microphones can be used to track noise and overall sound volumes. Feeds from electronic devices can act as sensors for both focus and environmental parameters by identifying open webpages, typing speed on a keyboard, open conferences, computer games, global positioning systems, and programs monitoring weather conditions.

A multitude of sound sensors (for measuring environment ambient sound) and associated computer programs and mobile applications for cell phones are commercially available. One example provides a simple way to measure and monitor audio volumes in an environment. The app would show the approximate ambient decibel (dB) level, also known as Sound Pressure Level (SPL). The sound can be measured and monitored with a smart phone. Any other external microphone could be connected to the computing device as well.

Other more accurate sound meters or sensors is can measure and monitor sound levels and record records using a USB interface for easy setup and data download from a computing device. Such systems are available which meet ANSI and IEC 61672 Class 2 standards with a 1.4 dB accuracy and manual or automatic programmed start methods.

Ambient temperature can be measured and monitored, for instance, by a heat sensor such as a resistance temperature detector (RTD) which is a temperature sensor with a resistor that changes its resistive value simultaneously with temperature changes to provide accuracy, repeatability and stability in ambient temperature measurements.

The present invention as described herein discloses a process for supporting, deploying and/or integrating computer infrastructure, integrating, hosting, maintaining, and deploying computer-readable code into the computer system 202, wherein the code 232 in combination with the computer system 202 is capable of implementing the methods of the present invention.

While FIG. 2 shows the computer system/device 202 as a particular configuration of hardware and software, any configuration of hardware and software, as would be known to a person of ordinary skill in the art, may be utilized for the purposes stated supra in conjunction with the particular computer system 202 of FIG. 2. For example, the memory devices 220 and 230 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of analyzing productivity of a person engaged in a task, said method comprising:
   receiving and storing, by a computing device into a memory of the computing device, data including identification of a task and measurements of baseline values of environmental parameters of a physical environment in which the person is performing the task;
   storing, by the computing device, values of environmental parameters received from and captured by environmental sensors, said values of environmental parameters impacting productivity of the person engaged in the task;
   determining and storing upon completion of the task, by the computing device, a current productivity value correlated to the values of environmental parameters, wherein the current productivity value defines productivity of the person engaged in the task in response to the values of environmental parameters received from and captured by the environmental sensors, said current productivity value being a time to complete the task or a volume of measurable entities completed during a time period of the task;
   determining and storing, by the computing device, an optimized productivity value corresponding to optimized values of environmental parameters by comparing the current productivity value and corresponding values of environmental parameters with historical productivity values and corresponding historical values of environmental parameters stored in the memory of the computing device, said optimized productivity value being an optimized time to complete the task or an optimized volume of measurable entities completed during a time period of the task; and automatically setting, by the computing device, the baseline values of environmental parameters to be equal to the optimized values of environmental parameters to which the optimized productivity value corresponds during a next performance of the task by the person while the person is exposed to the baseline values of environmental parameters during the next performance of the task by the person, said next performance of the task by the person having the optimized productivity value characterized by maximum productivity of the person engaged in the task in response to the person being exposed to the optimized values of environmental parameters to which the optimized productivity corresponds, said optimized values of environmental parameters being specific to the person and differing for different persons performing the task, said baseline values of environmental parameters and said optimized values of environmental parameters being physical characteristics of the physical environment.

2. The method of claim 1, wherein the environmental parameters include temperature, lighting, odors, vibrations, background music selection, air movement, and noise ambient to the person engaged in the task.

3. A computer program product, comprising one or more computer readable hardware storage devices having computer readable program code stored therein, said program code containing instructions executable by one or more processors of a computer system to implement a method of analyzing productivity of a person engaged in a task, said method comprising:

storing, by the computing device, values of environmental parameters received from and captured by environmental sensors, said values of environmental parameters impacting productivity of the person engaged in the task;

determining and storing upon completion of the task, by the computing device, a current productivity value correlated to the values of environmental parameters, wherein the current productivity value defines productivity of the person engaged in the task in response to the values of environmental parameters received from and captured by the environmental sensors, said current productivity value being a time to complete the task or a volume of measurable entities completed during a time period of the task;

determining and storing, by the computing device, an optimized productivity value corresponding to optimized values of environmental parameters by comparing the current productivity value and corresponding values of environmental parameters with historical productivity values and corresponding historical values of environmental parameters stored in the memory of the computing device, said optimized productivity value being an optimized time to complete the task or an optimized volume of measurable entities completed during a time period of the task; and automatically setting, by the computing device, the baseline values of environmental parameters to be equal to the optimized values of environmental parameters to which the optimized productivity value corresponds during a next performance of the task by the person while the person is exposed to the baseline values of environmental parameters during the next performance of the task by the person, said next performance of the task by the person having the optimized productivity value characterized by maximum productivity of the person engaged in the task in response to the person being exposed to the optimized values of environmental parameters to which the optimized productivity corresponds, said optimized values of environmental parameters being specific to the person and differing for different persons performing the task, said baseline values of environmental parameters and said optimized values of environmental parameters being physical characteristics of the physical environment.

4. The computer program product of claim 3, wherein the environmental parameters include temperature, lighting, odors, vibrations, background music selection, air movement, and noise ambient to the person engaged in the task.

5. A computer system, comprising one or more processors, one or more memories, and one or more computer readable hardware storage devices, said one or more hardware storage device containing program code executable by the one or more processors via the one or more memories to implement a method of analyzing productivity of a person engaged in a task, said method comprising:

receiving and storing, by a computing device into a memory of the computing device, data including identification of a task and measurements of baseline environmental parameters of a physical environment in which the person is performing the task;

storing, by the computing device, values of environmental parameters received from and captured by environmental sensors, said values of environmental parameters impacting productivity of the person engaged in the task;

determining and storing upon completion of the task, by the computing device, a current productivity value correlated to the values of environmental parameters, wherein the current productivity value defines productivity of the person engaged in the task in response to the values of environmental parameters received from and captured by the environmental sensors, said current productivity value being a time to complete the task or a volume of measurable entities completed during a time period of the task;

determining and storing, by the computing device, an optimized productivity value corresponding to optimized values of environmental parameters by comparing the current productivity value and corresponding values of environmental parameters with historical productivity values and corresponding historical values of environmental parameters stored in the memory of the computing device, said optimized productivity value being an optimized time to complete the task or an optimized volume of measurable entities completed during a time period of the task; and automatically setting, by the computing device, the baseline values of environmental parameters to be equal to the optimized values of environmental parameters to which the optimized productivity value corresponds during a next performance of the task by the person while the person is exposed to the baseline values of environmental parameters during the next performance of the task by the person, said next performance of the task by the person having the optimized productivity value characterized by maximum productivity of the person engaged in the task in response to the person being exposed to the optimized values of environmental parameters to which the optimized productivity corresponds, said optimized values of environmental parameters being specific to the person and differing for different persons performing the task, said baseline values of environmental parameters and said optimized values of environmental parameters being physical characteristics of the physical environment.

6. The computer system of claim 5, wherein the environmental parameters include temperature, lighting, odors, vibrations, background music selection, air movement, and noise ambient to the person engaged in the task.

\* \* \* \* \*